United States Patent Office 3,385,865
Patented May 28, 1968

3,385,865
METHOD FOR THE PRODUCTION
OF ISOINDOLES
Gerlinde Metzler, Stamford, Conn., assignor to American
Cyanamid Company, Stamford, Conn., a corporation
of Maine
No Drawing. Filed Dec. 13, 1965, Ser. No. 513,580
5 Claims. (Cl. 260—326.1)

ABSTRACT OF THE DISCLOSURE

A process for the preparation of isoindole compounds comprising reacting an orthodiketone with an excess of a mono-N-substituted ammonium formate, at from about 175° C. up to about 250° C. for a period of about ten hours up to about seventy-two hours.

The present invention relates to solution phase electroluminescence. The invention includes the discovery of a new class of compounds, a process for making the compounds, and a new class of compositions and process of use thereof.

It has been found, pursuant to the instant discovery, that an unexpectedly high degree of visible electro-luminescent emission may be generated by applying alternating current, at a sufficient voltage, to the electrodes, e.g., platinum, mercury, or the like, of an electrolytic cell in an inert solvent containing a particular class of fluorescent organic compounds of this invention and a suitable supporting electrolyte. The new compounds are also useful as battery depolarizers, dyes, chemiluminescent substances, etc.

I have discovered that a high order of luminescence can be obtained from a new class of electrochemiluminescent fluorescers of the isoindole formula:

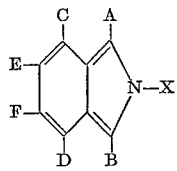

in which X is a member selected from the group consisting of either substituted or non-substituted alkyl and aryl substituents, in which A and B are each either a substituted or a non-substituted aryl substituent, and in which each of C, D, E, and F is selected from the group consisting of hydrogen and either substituted or nonsubstituted aryl substituents. Each of the above alkyl and aryl substituents may be any substituent which does not counteract the electrochemiluminescent-fluorescent property of the compounds of this invention. Typical aryl substituents include phenyl, 1-naphthyl, 1-anthracenyl, biphenyl, 2-naphthyl, 3-phenyl, p-cyanophenyl, p-alkoxylphenyl, p-dialkylaminophenyl, p-nitrophenyl, 2-anthracenyl, 9-anthracenyl, phenanthryl, 3 and 4 pyrenyl, tetracenyl, singly or multiply substituted alkoxy-aryl such as methoxyphenyl, dialkylamino-aryl such as dimethylaminophenyl, and the like. However, X, A and B may not be 3 and 4 pyridyl, p-cyanophenyl, nor p-nitrophenyl. Typical alkyl substituents include methyl, ethyl, propyl, etc., and their substituted forms, for electrochemiluminescence. The fluorescent compounds are characterized by (1) a polarographic oxidation state having cation radical of unexpectedly superior stability as compared to previously known electrochemiluminescent fluorescers, (2) an unexpectedly high fluorescence-efficiency, and (3) an unexpectedly superior long-lifetime of electrochemiluminescence. The lifetime, for example, of some compounds of this invention is more than four times that of the best isobenzofuran (illustrated in the copending application Ser. No. 509,148, filed Nov. 22, 1965) and about nine times that of rubrene. These properties are illustrated in the Table I below.

In order to obtain the electrochemiluminescence, it is critical that the electrochemiluminescent fluorescent isoindole compound of this invention be present in a concentration of at least about one millimolar up to about 20 millimoles. For the preferred results, it is critical that at least about 5 to about 10 millimoles be employed. The electrolyte may range from about 0.01 M to about 1.0 M, the preferred results requiring at least about 0.1 M.

Typically, dimethylformamide (DMF) solvent containing $2 \times 10^{-3}$ mole of the fluorescent compound of this invention, and 0.1 mole of tetrabutylammonium perchlorate as the supporting electrolyte is a system which will emit light, without any appreciable consumption of the solution components of the system as compared to prior systems, when placed in an electrolytic cell containing electrodes and 60-cycle alternating current applied to the electrodes. Visible light is emitted at or near each electrode surface as long as alternating current of sufficient voltage is applied.

Pursuant to the instant discovery, therefore, a method of generating a useful, visible, electroluminescent emission in an electrolytic cell has been found which comprises subjecting a fluorescent compound of this invention to an alternating current through at least two electrodes in an intimate contact with a medium comprising an inert solvent, a fluorescent organic compound of this invention, and a supporting electrolyte, said alternating current being at a sufficient voltage (potential) in at least one electrode to convert said fluorescent organic compound to its corresponding oxidized or reduced state, by giving up or taking on at least one electron, and said alternating current providing sufficient potential (voltage) change on reversal of the alternating cycle to provide an amount of energy about sufficient to ultimately transform (regenerate) said fluorescent organic compound to its original oxidation state but in its singlet excited state. The compound rapidly returns to its ground (non-excited) state by the emission of light.

As indicated above, the fluorescent organic compound is either alternately oxidized to an oxidized state (i.e., a cation radical), in what is the anodic excursion of the applied potential and reduced to the excited state of the fluorescent organic compound in what is the cathodic excursion of the applied potential; or the fluorescent organic compound is reduced to a reduced state (i.e., an anion radical) in what is the cathodic excursion of the applied potential and oxidized to the excited state of the fluorescent organic compound in what is the anodic excursion of the applied potential. Fluorescent compounds which emit red light upon excitation require at least anodic or cathodic voltage excusion and, consequently, the least voltage change at an electrode to provide visible light. On the other hand, fluorescent compounds which emit blue light upon excitation require greater anodic or cathodic excursions and higher voltage change at the electrode.

The upper and lower limits of the instantaneous potential applied to the electrode required to produce light will depend on the fluorescent organic compound used. Thus either the upper limit of the applied potential must be sufficiently positive to convert the fluorescent organic compound to an oxidized state or the lower limit of the potential applied to the electrode must be sufficiently negative to convert the fluorescent organic compound to a reduced state. Moreover, the potential difference between the upper and lower values of the instantaneous applied potential must be at least about sufficient to provide enough energy to produce said fluorescent organic compound in its singlet excited state.

Broadly, the voltage requirement may be defined as ranging from about 5 volts to 10 volts. The optimum and therefore preferred results are obtained when a voltage of at least about 6 v. up to not more than about 7 v. is employed.

In general terms, the process described above requires only electron transfer to a cation radical or electron transfer from an anion radical in an electrolyte cell where electron transfer occurs over a sufficient potential to provide an excited state, and where the resulting excited state or a subsequently formed excited state is capable of fluorescent emission of light. The general process is described in Equations 1 and 2 below where $A^+$ and $A^-$ refer to a cation radical and an anion radical respectively, E refers to an electron, and $A^*$ refers to an excited state produced by electron transfer.

(1) $$A^+ + E \rightarrow A^*$$

(2) $$A^- - E \rightarrow A^*$$

The singlet excited state of the fluorescent organic molecule may be obtained directly typically as in Equation 3 or by an indirect route, typically as shown in Equation 4 below.

(3) (a) $A^+ + A^- \rightarrow A^* + A^\circ$; (b) $A^* \rightarrow A^\circ + light$ (4) (a) $A^+ + A^- \rightarrow A\ddagger + A^\circ$; (b) $A\ddagger \rightarrow A^* + A^\circ$; (c) $A^* \rightarrow A^\circ + light$ The potential difference required by the indirect route normally is lower than that required by the direct route.

Generally, the potential difference between the upper and lower limits of the instantaneous applied voltage must exceed about 1.5 volts.

Potentials (relative to a standard electrode, such as the saturated calomel electrode), required to oxidize or reduce organic compounds of the type contemplated herein can be easily measured by standard polarographic techniques. Cf. I. M. Kolthoff and J. J. Lingane, Polarograph, 2nd ed., 1952, Interscience Publishing, New York, N.Y. Likewise minimum energy required for converting organic compounds of the type contemplated herein to their singlet excited states are easily measured by such techniques as absorption or emission spectroscopy. Cf. S. F. Mason, Molecular Electronic Absorption Spectra, Quarterly Review, 15, 287 (1961).

The process of the present invention has multiple uses in the fields of illumination, information display, etc. For instance, an electrolytic cell is in essence a light bulb, the electrolytic cell comprising a stoppered transparent bottle having two electrodes therein, the ends of which are immersed in the fluorescnet-solvent-electrolyte system. If desired, the bulb-shaped cell could be replaced by a tubular, or cube-shaped cell, or by any other design desired. Likewise, multiple pairs of electrodes may be used in any given cell, each pair operating independently, if desired. Still other uses will be discussed in greater detail hereinafter.

Obviously, as indicated hereinabove, the solution system as well as the nature of the electrode determine the upper limit of the potential difference.

Insofar as the frequency of the applied alternating voltage is concerned, it can range from a few cycles per minute up through the audio range and beyond.

Broadly the frequency may range from about 50 to about 200 cycles per second. To obtain the optimal (and therefore the preferred) results, the frequency should be at least about 60 cycles per second.

Temperature does not appear to be critical, the temperature normally ranging from zero up to about 60° C.

A wide variety of supporting electrolytes may be employed herein to effect the invention. It is essential that these electrolytes do not hinder to any substantial degree the necessary anodic or cathodic excursion, for instance, and thus prevent conversion of the organic fluorescent compound to its excited state. It will be recognized by the person skilled in the art that a non-interfering electrolytic for one organic fluorescent compound may interfere with another organic fluorescent compound, and vice versa. Obviously, therefore, it is within the purview of the instant discovery and within the skill of a chemist to employ an electrolyte which is compatible with the organic fluorescent compound employed. The electrolyte should likewise be electro-inactive over the potential range required for the luminescent reaction, it should provide satisfactory conductivity, and it should not quench the luminescence.

Typical suitable electrolytic cations are tetra-alkyl (lower) ammonium ions, alkali metal ions, alkaline earth ions, and the like. Typical anions are perchlorate ions, hexafluoroarsenate ions, hexafluoraphosphate ions, chloride ions, bromide ions, and the like. Thus, typical compounds include tetraethylammonium bromide, tetraethylammonium perchlorate, tetra-n-butyl ammonium perchlorate, lithium bromide, sodium perchlorate, tetramethylammonium hexafluoroarsenate, tetrabutylammonium tetraphenyl borate, calcium perchlorate, tetrapropyl ammonium hexafluorophosphate, lithium aluminum chloride, tetrabutyl ammonium bromide, etc.

Insofar as solvents are concerned, a wide variety of these may be employed. In fact, any substantially inert organic or inorganic solvent for the organic fluorescent compound and electrolyte, which solvent is sufficiently non-protonating and irreducible to preserve the desired degree of reversibility (i.e., it should provide a lifetime of the radical ion at least equivalent to the reciprocal of the frequency employed) is satisfactory provided it is rendered conducting by the addition of an electrolyte of the type contemplated herein.

Typical solvents are the following aprotic solvents: nitriles, such as acetonitrile: sulfoxides, such as dimethylsulfoxide, ethers, such as tetrahydrofuran dioxane, diethyl ether, 1,2-dimethoxyethane, and the like; amides, such as dimethylformamide (i.e., DMF): carbonates, such as propylene carbonate; nitroalkanes, such as nitromethane; dialkyl sulfites, such as dimethylsulfite; and other like solvents. The preferred solvent, however, is DMF.

It is not necessary that these solvents be anhydrous, since up to about 10% water has been present in some cases without interfering with the emission of visible light. The person skilled in the art will recognize that numerous other substantially inert organic and inorganic solvents, even though not essentially or substantially aprotic, are compatible with the process and solution system and are substantially not fluorescence quenchers. Solvent mixtures may likewise be employed.

In conjunction with the excited state referred to hereinbefore, it should be noted that the "energy of an excited state" is an easily measured experimental value. For example, the energy difference between a first excited singlet and its corresponding ground state is defined by the frequency of the first absorption band in the ultraviolet or visible spectrum of the ground state species.

The physical energy released by a reaction is also an experimental quantity. For instance, the energy of a reaction of the type given in the specific embodiment described above, can be determined by polarographic measurements and other procedures well known to the physical chemist.

Thus, the operable limits of electroluminescence are capable of independent measurement and of clear definition in terms of physical characteristics. Consequently, generating electroluminescent emission by the process contemplated herein can be accomplished by first recognizing the known physical characteristics of the fluorescent organic compound, as well as the physical characteristics of the inert solvent and the electrolyte to be used. It has been found, however, that the potential change during the electrode excursion can be several tenths of a volt less than that required to provide the energy of a singlet excited state and still be sufficient to generate noticeable light emission. Best results are generally obtained, however, when the calculated singlet excitation energy or more is provided. It should also be noted that the voltages referred to are exclusive of additional voltages that might be required to overcome the electrical resistance of the solvent-electrolyte employed.

The temperature at which the above-defined electrochemiluminescent process of the present invention is carried out is not critical; very excellent results have been achieved at ambient temperatures. For best results the solvent employed is deaerated, such as by bubbling nitrogen, or the like, therethrough, thus providing improved conditions and helping to insure a substantially inert solvent.

It should be noted that the isoindole compounds of this invention, as fully defined above, cannot be made by conventional methods (for making isoindoles) as described in the literature. Accordingly, a novel process for producing the isoindoles of this invention is the reacting of an orthodiketone with an excess of a mono-N-substituted ammonium formate, is from about 175° C. up to about 250° C. for a period of about ten hours up to about seventy-two hours. The preferred temperature, critical to obtain the preferred results, is from about 190° C. up to about 215° C. The preferred ratio of the formate compound to the ketone compound is at least about 4:1, this minimum ratio being critical to obtain the preferred results. Also, to obtain the preferred results, it is critical that the reaction mixture be substantially in the absence of a solvent. A reaction time of fifteen to twenty-four hours has proven to be satisfactory. Typical of the orthoketones employable in the process is 1,4-diphenyl-2,3-dibenzoylbenzene of the formula:

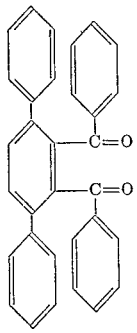

Representative (but not exclusive) examples of orthoketones, in the order of preference, are: 1,4-diphenyl-2,3-di-p-anisoylbenzene; 1,4-diphenyl, 2,3-dibenzoylbenzene; 1,4-di-p-anisyl-2,3-dibenzoylbenzene; 1,4-di-p-anisyl-2,3-di-p-anisoylbenzene; 1,4 - di-x-naphthyl-2,3-dibenzoylbenzene; and 1,4-di-1-pyrenyl - 2,3 - dibenzoylbenzene. Typical representative (but not exclusive) mono-substituted ammonium formates are those in which the N-substituent is methyl, ethyl, n-propyl, isopropyl, phenyl, naphthyl, pyrenyl, and the like, in the order of preference. Alkyl N-substituents are preferred to aryl substituents.

The brightness and lifetime of electrochemilumi-nescence depends on the interplay of many variables. We are not sure that we know them all.

One of these variables seems to be the voltage. A characteristic voltage, commonly 7–8 v., although 5–10 v. is probably the ultimate range.

Another variable is the frequency of the imposed A.C. current. Each compound may well have its own characteristic A.C. frequency for maximum brightness.

Another factor is the wavelength of maximum ECC emission. The closer this is to the eye's maximum sensitivity, the brighter the light will appear. A rough correlation of this is observed in the isoindoles. These compounds all emit at the same wavelength maximum as their fluorescence spectrum maximum. This is not true with all electrochemiluminescent substances.

A further factor is the concentration and solubility of the compound. In DMF the desired concentration appears to be about 10 mm. Many otherwise promising compounds (rubrene) are not that soluble.

Fluorescence efficiency is also a factor. Of a given number of molecules that reach the exicted state only a fraction will, in dropping down to the ground state, emit light that will ultimately be seen by the viewer. This fraction is in turn determined by several factors.

The nature of the solvent, electrolyte electrodes and geometry of the cell will also effect the brightness and lifetime. DMF, Bu$_4$NClO$_4$ and Pt gauze spaced as closely as possible have so far proven most desirable.

Stability of the oxidation and reduction products of the fluorescer seems to be involved especially with the lifetime of the ECL event since the voltage range to which the molecule is subjected is great enough for it to undergo both oxidation and reduction by electron transfer. Reaction or decomposition of the oxidation and/or reduction products of the fluorescer results in loss of fluorescer.

Table I below illustrates the optimum stability, brightness, lifetime, and other physical properties. Table I demonstrates many of the points indicated here.

The following Examples I and II illustrate the method of preparation of the novel compounds of this invention, and Table I illustrates the results upon evaluation of several isoindoles of this invention, and compares the results with prior electrochemiluminescent compounds such as rubrene and such as the isobenzofuran compounds of the copending U.S. Ser. No. 509,148, filed Nov. 22, 1965.

The following examples and Table I are intended only for purposes of illustration and do not limit the scope of the invention except as stated, and except as the appended claims are limited.

Example I

N - methyl - 2,7 - di - p - anisyl - 3,6 - di - phenylisoindole is prepared by refluxing at about 210 to 215° C. 4 grams of 1,2-di-p-anisoyl-3,6-di-phenylbenzene with 15 ml. of mono methylammonium formate for about 24 hours, under an inert atmosphere such as nitrogen, followed by cooling, filtering multiple recrystallization from a liquid such as benzene, to obtain a yield of about 1.46 grams (40%) and having a melting point of about 237–239° C. The properties of the compound are illustrated in Table I.

Example II

N-methyl-2,3,6,7-tetraphenylisoindole is prepared by refluxing at about 190° to 195° C. about 3.5 grams of 1,2-dibenzoyl-3,6-diphenylbenzene in admixture with a four-fold excess (by weight) of monomethylammonium formate, for about 15 hours, followed by cooling the yellow-green crystals, adding a minor amount of methanol, filtering, and multiple (twice) recrystallization, to obtain a yield of about 1.5 grams (35%) having of about M.P. 281–283° C. The properties of the compound are illustrated in Table I.

TABLE I

| Compound | Voltage For Maximum Brightness, v. | Frequency For Maximum Brightness, c.p.s. | Wavelength of Maximum ECL Emission, mμ | Concentration For Maximum Brightness, mM. | Fluorescence Efficiency, F.E. | Stability of i.c. Oxid. Prod., sec. | Stability of i.c. Red. Prod., sec. | Brightness (maximum) footlamberts | Lifetime (maximum) min. |
|---|---|---|---|---|---|---|---|---|---|
| N-methyl-2,3,6,7-tetra phenyl isoindole | 8 | | 485 | 2 | .53 | >15 | 2 | 3.8 | 250 |
| N-methyl-2,7-di-p-anisyl 3,6-diphenylisoindole | 8 | | 515 | 5 | .52 | >15 | 1–2 | 7.2 | 1,800 |
| Rubrene | 6 | 60 | 550 | 1 2 | .17 | 5 | >15 | 5 | 200 |
| 2,3,6,7-tetraphenyl isobenzofuran | 8 | 120–130 | 510 | 6 | .51 | 1.0 | >15 | 22 | 405 |
| 2,7-diphenyl-3,6-di-p-methoxyphenylisobenzofuran | 8 | | 510 | | | 3.9 | >15 | 2 3.2 | 80 |
| 2,3,6,7-tetra-p-methoxyphenylisobenzofuran | 7 | | 530 | | | 0.5 | >15 | 2 19 | 120 |

1 Sat.   2 5mM.

The last two columns in the table clearly indicate in terms of maximum brightness and lifetime the compounds which are most desirable. Further improvements in lifetimes in these systems can be anticipated when the many variables which affect this property are fully explored. The stability of the isoindole compounds of this invention is clearly superior.

Clearly the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

What is claimed is:

1. A process for the preparation of an isoindole of the formula:

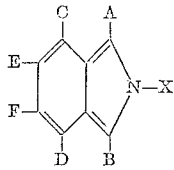

wherein

X is a substituent selected from the group consisting of lower alkyl, phenyl, 1-naphthyl, 1-anthracenyl, biphenyl, 2-naphthyl, 3-phenyl, p-alkoxyphenyl, p-dialkylaminophenyl, 2-anthracenyl, 9-anthracenyl, phenanthryl, 3- and 4-pyrenyl, tetracenyl, alkoxyphenyl and dialkylamino-phenyl;

A and B are substituents selected from the group consisting of phenyl, 1-naphthyl, 1-anthracenyl, biphenyl, 2-naphthyl, 3-phenyl, p-alkoxyphenyl, p-dialkylaminophenyl, 2-anthracenyl, 9-anthracenyl, phenanthryl, 3- and 4-pyrenyl, tetracenyl, alkoxyphenyl and dialkylaminophenyl; and C, D, E and F are substituents selected from the group consisting of hydrogen, phenyl, 1-naphthyl, 3-phenyl, p-alkoxyphenyl, p-cyanophenyl, p-dialkylaminophenyl, p-nitrophenyl, 2-anthracenyl, 9-anthracenyl, phenanthryl, 3- and 4-pyrenyl, tetracenyl, alkoxyphenyl, and dialkylaminophenyl;

by reacting an orthodiketone of the formula:

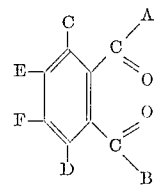

with a mono-substituted ammonium formate wherein the ammonium moiety has the formula:

wherein A, B, C, D, E, F and X are as above defined, at from about 175° C. to about 250° C. for a period from about ten hours to about seventy-two hours.

2. A process according to claim 1 in which said reacting is carried out at from about 190° C. up to about 215° C.

3. A process according to claim 1 in which said formate and said ketone are in a ratio of at least about 4:1 by weight.

4. A process according to claim 1 in which said reacting is carried out substantially in the absence of a solvent.

5. A process according to claim 4 in which said reacting is carried out at from about 190° C. up to about 215° C., and said formate and said ketone are in a ratio of at least about 4:1 by weight.

References Cited

UNITED STATES PATENTS 3,007,939   11/1961   Norton _____ 260—326.1

NICHOLAS S. RIZZO, *Primary Examiner.*

M. O'BRIEN, J. A. NARCAVAGE, *Assistant Examiners.*

UNITED STATES PATENT OFFICE
CERTIFICATE OF CORRECTION

Patent No. 3,385,865                      May 28, 1968

Gerlinde Metzler

It is certified that error appears in the above identified patent and that said Letters Patent are hereby corrected as shown below:

Column 3, line 17, "6 v." should read -- 6 V. --; same line 17, "7 v." should read -- 7 V. --. Column 6, line 4, "7-8 v." should read -- 7-8 V. --; same line 4, "5-10 v." should read -- 5-10 V. --; line 18, "10 mm." should read -- 10 mM. --. Columns 7 and 8, TABLE I, footnote thereof, "¹Sat." should read -- ¹∼Sat. --.

Signed and sealed this 3rd day of March 1970.

(SEAL)
Attest:

Edward M. Fletcher, Jr.                        WILLIAM E. SCHUYLER, JR.
Attesting Officer                                  Commissioner of Patents